United States Patent
Comandore et al.

(10) Patent No.: US 11,162,382 B2
(45) Date of Patent: Nov. 2, 2021

(54) METHOD AND SYSTEM FOR ENGINE OPERATION

(71) Applicant: General Electric Company, Schenectady, NY (US)

(72) Inventors: Rangasai Madoor Comandore, Bangalore (IN); Narayanan Payyoor, Bangalore (IN)

(73) Assignee: General Electric Company, Schenectady, NY (US)

( * ) Notice: Subject to any disclaimer, the term of this patent is extended or adjusted under 35 U.S.C. 154(b) by 179 days.

(21) Appl. No.: 16/281,242

(22) Filed: Feb. 21, 2019

(65) Prior Publication Data

US 2020/0271011 A1    Aug. 27, 2020

(51) Int. Cl.
| | | |
|---|---|---|
| F01D 21/00 | (2006.01) |
| B64D 31/00 | (2006.01) |
| F02C 9/00 | (2006.01) |
| B64D 27/10 | (2006.01) |

(52) U.S. Cl.
CPC .............. *F01D 21/00* (2013.01); *B64D 27/10* (2013.01); *B64D 31/00* (2013.01); *F02C 9/00* (2013.01); *F05D 2220/323* (2013.01); *F05D 2270/11* (2013.01); *F05D 2270/44* (2013.01)

(58) Field of Classification Search
CPC ......... F01D 21/00; B64D 27/10; B64D 31/00; F02C 9/00; F05D 2220/323; F05D 2220/11; F05D 2220/44
See application file for complete search history.

(56) References Cited

U.S. PATENT DOCUMENTS

| | | | | |
|---|---|---|---|---|
| 7,742,881 B2 * | 6/2010 | Muralidharan | ....... | F01D 25/285 |
| | | | | 702/33 |
| 8,090,456 B2 * | 1/2012 | Karpman | ............... | G05B 17/02 |
| | | | | 700/45 |
| 10,040,577 B2 | 8/2018 | Teicholz et al. | | |
| 2017/0234167 A1 * | 8/2017 | Stachowiak | ........... | B64D 35/00 |
| | | | | 416/1 |
| 2017/0234231 A1 * | 8/2017 | Virtue, Jr. | ............... | F01D 25/34 |
| | | | | 416/1 |
| 2018/0022464 A1 | 1/2018 | Gelwan et al. | | |
| 2018/0023413 A1 | 1/2018 | Chowdhury et al. | | |
| 2018/0023484 A1 | 1/2018 | Gelwan et al. | | |
| 2018/0265223 A1 | 9/2018 | Teicholz et al. | | |
| 2019/0186286 A1 * | 6/2019 | Lowery | .................... | H05H 1/46 |
| 2019/0302712 A1 * | 10/2019 | Neti | ...................... | G06Q 10/067 |
| 2019/0304673 A1 * | 10/2019 | Neti | ....................... | G01R 31/62 |
| 2020/0271011 A1 * | 8/2020 | Comandore | ............ | F01D 21/00 |

\* cited by examiner

*Primary Examiner* — Russell Frejd
*Assistant Examiner* — Wae L Louie
(74) *Attorney, Agent, or Firm* — Dority & Manning, P.A.

(57) ABSTRACT

A method for operating a turbine engine is provided. The method includes receiving operating data comprising at least an engine operation parameter, an environmental parameter, a location parameter, and a time parameter; operating the turbine engine based on a baseline ground operation schedule; generating an adjusted ground operation schedule based on the operating data and the baseline ground operation schedule, wherein generating the adjusted ground operation schedule is based on a machine learning algorithm; and operating the engine based on the adjusted ground operation schedule.

20 Claims, 4 Drawing Sheets

METHOD AND SYSTEM FOR ENGINE OPERATION

FIELD

The present subject matter relates generally to digital systems for identifying adverse turbo machine operation contributors and performing operational adjustments for mitigation or alleviation thereof.

BACKGROUND

During operation of a gas turbine engine, heat accumulates at rotor assemblies. Following shutdown of the engine, the accumulated heat at the rotor assembly is asymmetrically or non-uniformly released such as to define a thermal gradient that induces distortion or bowing of the rotor assembly. Such bowing, referred to as rotor bow, thermal bowing, a bowed rotor start (BRS), or as defining a bowed rotor condition in the engine, creates eccentricity of the rotor assembly relative to an axial centerline axis and surrounding casings. Bowed rotor further results in increased unbalance at the rotor assembly. Such unbalance and eccentricities result in the rotor assembly making undesired contact at the surrounding casing, resulting in damage to the surrounding casing, the rotor assembly, or a bearing assembly, or engine performance losses. Such damage may result in engine failure or necessitate maintenance or overhaul of the engine, resulting in increased engine operating costs.

Known solutions for alleviating a bowed rotor condition include motoring (i.e., rotating the engine without combustion) the rotor assembly to reduce the thermal gradient, thereby reducing eccentricity of the rotor assembly relative to the surrounding casings. However, such solutions may include motoring the rotor assembly for relatively long periods that adversely affect an amount of time to start or re-start an engine following shutdown. Such relatively long periods adversely affect an ability of commercial engine operators (e.g., airlines) to load an aircraft and begin taxi and takeoff, as such, increasing operating costs of the engine and aircraft and undesirably affecting the end user.

Further solutions include schedules from an engine manufacturer such that the engine undergoes a preset routine to alleviate bowed rotor during engine restart. However, such preset schedules may generally apply a solution whether the BRS condition has occurred, or uses physics-based approaches to identifying the bowed rotor condition and altering the control logic. Despite such solutions, there is a need for systems and methods that can more quickly identify, alleviate, or mitigate bowed rotor condition such as to improve turnaround times and engine performance and operation.

BRIEF DESCRIPTION

Aspects and advantages of the invention will be set forth in part in the following description, or may be obvious from the description, or may be learned through practice of the invention.

An aspect of the present disclosure is directed to a method for operating a turbine engine. The method includes receiving operating data comprising at least an engine operation parameter, an environmental parameter, a location parameter, and a time parameter; operating the turbine engine based on a baseline ground operation schedule; generating an adjusted ground operation schedule based on the operating data and the baseline ground operation schedule, wherein generating the adjusted ground operation schedule is based on a machine learning algorithm; and operating the engine based on the adjusted ground operation schedule.

In one embodiment, generating the adjusted ground operation schedule based on the machine learning algorithm includes generating the adjusted ground operation schedule based on a classification algorithm.

In various embodiments, the ground operation schedule includes a bowed rotor mitigation schedule including a rotor speed, a rotor acceleration, a duration of rotation of the rotor assembly, and a frequency of changes to the rotor speed from a first speed to a second speed. In one embodiment, the bowed rotor mitigation schedule includes one or more of a motoring schedule or a ground idle schedule. In another embodiment, adjusting the ground operation schedule includes adjusting the motoring schedule prior to ignition of the engine. In still another embodiment, adjusting the ground operation schedule includes adjusting the ground idle schedule prior to increasing output power at the engine.

In still various embodiments, the operational data includes the environmental parameter defining one or more ambient air parameters at a geographic location at which the engine is located prior to adjusting the ground operation schedule. In one embodiment, the operational data includes the time parameter defining an engine operation duration between takeoff at a first geographic location and shutdown at a second geographic location. In various embodiments, the method further includes comparing the engine operation parameter defining at least a takeoff condition and shutdown condition, the time parameter corresponding to each of the takeoff condition and the shutdown condition, the location parameter corresponding to a first geographic location and a second geographic location, and the environmental parameter corresponding to an ambient air parameter corresponding to each of the first geographic location and the second geographic location. In one embodiment, the engine operation parameter further includes one or more of a lubricant temperature, a lubricant pressure, a rotor surface temperature, an air temperature within the engine, an engine cycle quantity, or a duration of engine operation between the takeoff condition and the shutdown condition.

In still yet various embodiments, the method further includes generating an adjusted aircraft operating schedule based at least on the adjusted ground operation schedule. In one embodiment, generating the adjusted aircraft operating schedule includes adjusting the location parameter defining one or more of a second geographic location at which the shutdown condition occurs, or a location pair comprising a first geographic location at which a takeoff condition occurs and the second geographic location. In another embodiment, generating the adjusted aircraft operating schedule comprises adjusting the time parameter corresponding to the location pair, in which adjusting the time parameter corresponding to the location pair determines whether or when the aircraft operates at one or more of the first geographic location or the second geographic location.

Another aspect of the present disclosure is directed to a gas turbine engine including a sensor configured to obtain one or more engine operation parameters based at least on a rotor assembly or a lubricant system, and a controller. The controller is configured to store a baseline ground operation schedule and a machine learning algorithm. The controller is further configured to execute operations. The operations include receiving, via the sensor, operating data including at least an engine operation parameter, an environmental parameter, a location parameter, and a time parameter; operating the gas turbine engine based on a baseline ground operation schedule; generating, via the machine learning algorithm, an adjusted ground operation schedule based on the operating data and the baseline ground operation schedule; and operating the gas turbine engine based on the adjusted ground operation schedule.

In one embodiment, the ground operation schedule includes a rotor speed, a rotor acceleration, a duration of rotation of the rotor assembly, and a frequency of changes to the rotor speed from a first speed to a second speed.

In another embodiment, generating the adjusted ground operation schedule includes adjusting one or more of a motoring parameter or a ground idle condition parameter based at least on end user route data.

In still another embodiment, the operations further include comparing the engine operation parameter defining at least a takeoff condition and shutdown condition, the time parameter corresponding to each of the takeoff condition and the shutdown condition, the location parameter corresponding to a first geographic location and a second geographic location, and the environmental parameter corresponding to an ambient air parameter corresponding to each of the first geographic location and the second geographic location.

In still yet another embodiment, the operations further include generating an adjusted aircraft operating schedule based at least on the adjusted ground operation schedule, in which generating the adjusted aircraft operating schedule comprises adjusting the location parameter defining one or more of a second geographic location at which the shutdown condition occurs, or a location pair comprising a first geographic location at which a takeoff condition occurs and the second geographic location.

Yet another aspect of the present disclosure is directed to a computer-implemented method for mitigating rotor bow at a gas turbine engine. The method includes receiving operating data including at least an engine operation parameter, an environmental parameter, a location parameter, and a time parameter; operating the gas turbine engine based on a baseline ground operation schedule; generating, via a machine learning algorithm, an adjusted ground operation schedule based on the operating data and the baseline ground operation schedule; and operating the gas turbine engine based on the adjusted ground operation schedule.

In one embodiment, the ground operation schedule includes adjusting one or more of a motoring schedule or a ground idle schedule based at least on the environmental parameter at a geographic location at which the engine is located prior to adjusting the ground operation schedule, and further based at least on the time parameter corresponding at least to engine operation duration between takeoff at a first geographic location and shutdown at a second geographic location. These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Embodiments of a system and method for improved operation of a turbine engine to alleviate or mitigate bowed rotor condition are provided. The embodiments provided herein provide a data from an adjusted digital twin to a ground operation schedule of the engine that utilizes a machine-learned classification algorithm to identify contributors to bowed rotor conditions. The digital twin may further be optimized via data received from the engine, or engine fleets, based on obtained engine operation parameters. The methods and systems provided herein provide benefits over physics-based predictive models by utilizing engine operational data to generate probabilistic determinative models for adjusting a ground operation schedule of the engine to more efficiently and effectively address and predict bowed rotor or other adverse operating conditions of the engine.

Figure 1:
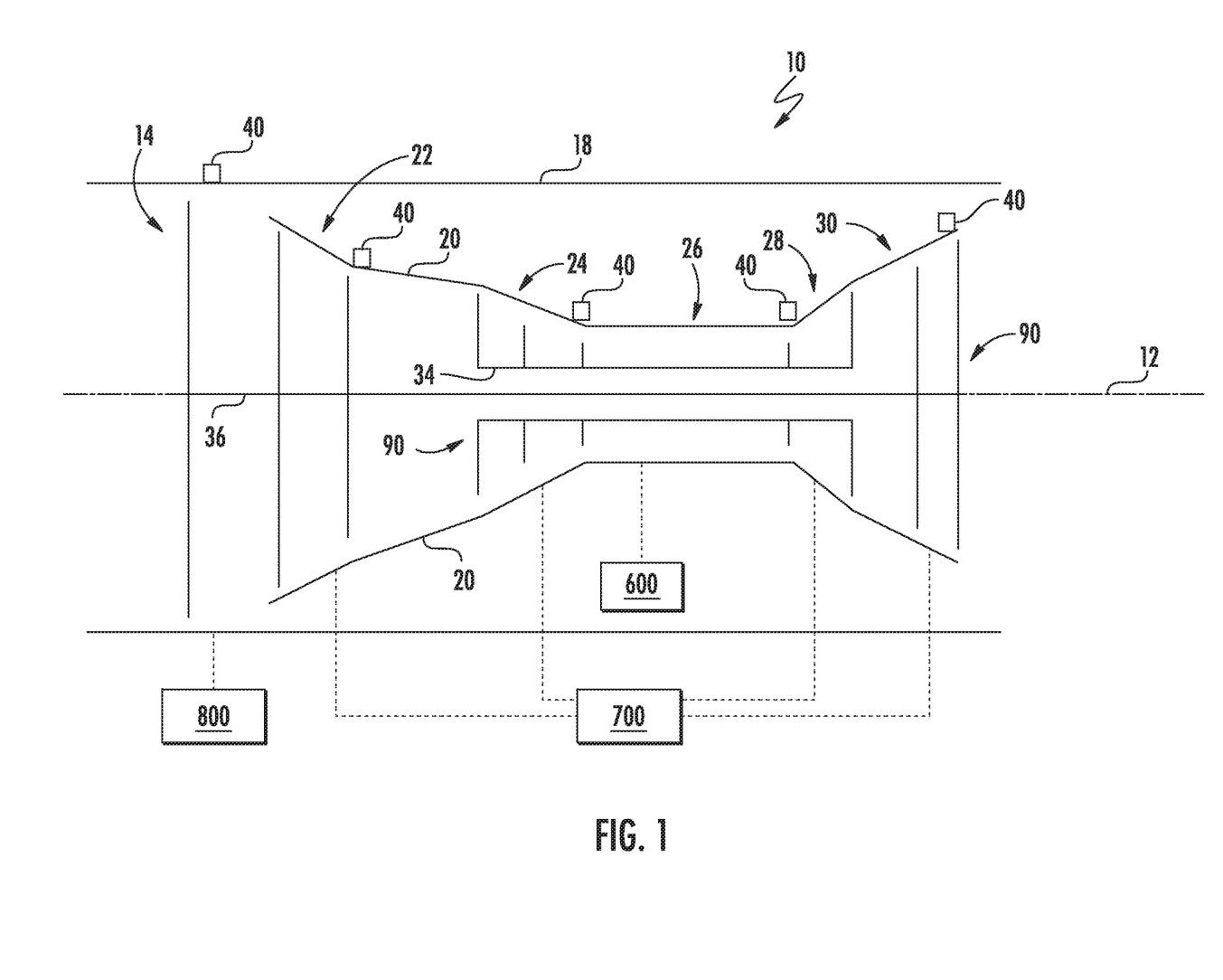
FIG. 1 is an exemplary schematic view of a turbo machine according to an aspect of the present disclosure.

Referring now to the drawings, FIG. 1 is a schematic exemplary turbo machine 10 (hereinafter, "engine 10") as may incorporate various embodiments of the present invention. The engine 10 may define a turbofan, turboprop, turbojet, or turboshaft configuration, including, those for commercial, military, and general aircraft and marine propulsion, or power generation, or other suitable uses of the engine 10.

The engine 10 includes an engine core including a first compressor 22 (e.g., a high pressure or HP compressor), a second compressor 24 (e.g., a low pressure or LP compressor), a combustion section 26, a second turbine 28 (e.g., an HP turbine), and a first turbine 30 (e.g., an LP turbine) in serial flow arrangement. A first shaft 36 drivingly connects the first compressor 22 and the first turbine 30. A second shaft 32 drivingly connects the second compressor 24 and the second turbine 28. A fan section 14 is connected to the LP shaft 36 and is driven by the second turbine 30. Combinations of the rotatable portions of the compressors 22, 24 and the turbines 28, 30 drivingly connected together via respective shafts 34, 36 each define rotor assemblies 90 of the engine 10.

Various embodiments may further include a third compressor and/or turbine or more, interdigitated arrangements of a first and second compressor or more, interdigitated arrangements of a first and second turbine or more, counter-rotating arrangements, indirect drive (e.g., geared) arrangements, prop fan arrangements, or other turbine engine arrangements. It should further be appreciated that the engine 10 may include an electric machine or other power generating apparatus in addition to or in lieu of the combustion section 26 such as to generate thrust or output power.

An outer casing 18, such as a nacelle, may be extended longitudinally and circumferentially around at least the fan section 14. An inner casing 20 is extended longitudinally and circumferentially around the engine core such as to define a core flowpath across the compressors 22, 24, the combustion section 26, and the turbines 28, 30. The inner casing 20 and the radially outward ends of the compressor and turbine rotor assemblies are typically in close arrangement such as to define relatively small clearances therebetween to maximize performance and efficiency.

The engine 10 includes a plurality of sensors 40 configured to measure, obtain, calculate, or otherwise receive one or more engine operation parameters of the engine 10, such as further described herein. The engine operation parameters may be based at least on the rotor assembly 90, such as surface temperature, proximate air temperature, rotational speed, vibrations, or loads. The engine operation parameters may additionally, or alternatively, be based on a lubricant system 700 of the engine 10 configured to provide and condition lubricant through the engine 10, including adjusting or otherwise altering temperature or pressure (e.g., via heat exchangers, valves, manifolds, etc.) of the lubricant based on a desired performance of the engine 10, such as further described herein. The engine operation parameters may still further be based on a fuel system 600 of the engine 10, such as to provide a conditioned fuel through the engine 10 based on one more of a desired fuel temperature, fuel pressure, viscosity, or usage of the fuel as a heat sink to control a temperature elsewhere at the engine 10.

The engine 10 further includes a computer system or controller 800 configured to store a baseline ground operation schedule and a machine learning algorithm, such as further described below. The controller 800 is further configured to store instructions and controls for operation of the engine 10, such as variable vane schedules for the compressors, bleed manifold schedules for compressors and turbines, fuel schedules for the fuel system 600, instructions for the lubricant system 700 controlling supply and scavenge pressure, temperature, or flow rates, or lubricant system damper temperatures, pressures, etc., or operating instructions for bowed rotor start (BRS) mitigation.

During operation of the engine 10, thermal bowing or bowed rotor may result at the rotor assembly 90 following operation and shutdown of the engine due to non-uniform heat release at the rotor assembly. Bowed rotor may cause the rotor assembly 90 to deform such as to generate eccentricity of the rotor assembly 90 relative to an axial centerline axis 12 of the engine 10, around which the cases 18, 20 and the rotor assemblies 90 are generally concentric during desired operation. Eccentricity between the rotor assembly 90 and the surrounding cases 18, 20 may result in the rotor assembly 90 making undesired contact with the surrounding cases 18, 20, thereby generating high levels of undesired vibrations that may damage the rotor assembly 90 and the engine 10 generally. The high vibrations may further be indicative of eccentric motion of the rotor assembly 90, which may result in performance losses at the engine 10 and/or hard contact with the surrounding cases, thereby damaging the casing 18, 20, rotor blades, bearings, or other portions of the engine 10.

During operation, the controller 800 includes a BRS mitigation schedule configured to partially or fully rotate the rotor assembly 90 such as enable more uniform thermal conditions across the rotor assembly 90 (i.e., reducing the thermal gradients that cause bowed rotor). Various BRS mitigation schedules include an amount of rotation (e.g., 45 degrees, 90 degrees, 180 degrees, etc.), a rate of rotation (i.e., RPM), a frequency at which rotation will start and stop (e.g., a period of time over which start and stop of partial or full rotation of the rotor assembly occurs), and a duration over which the frequency of rotation shall be conducted (e.g., an overall period of time over which the quantity of partial or full revolutions within the period of time shall occur).

Figure 2:
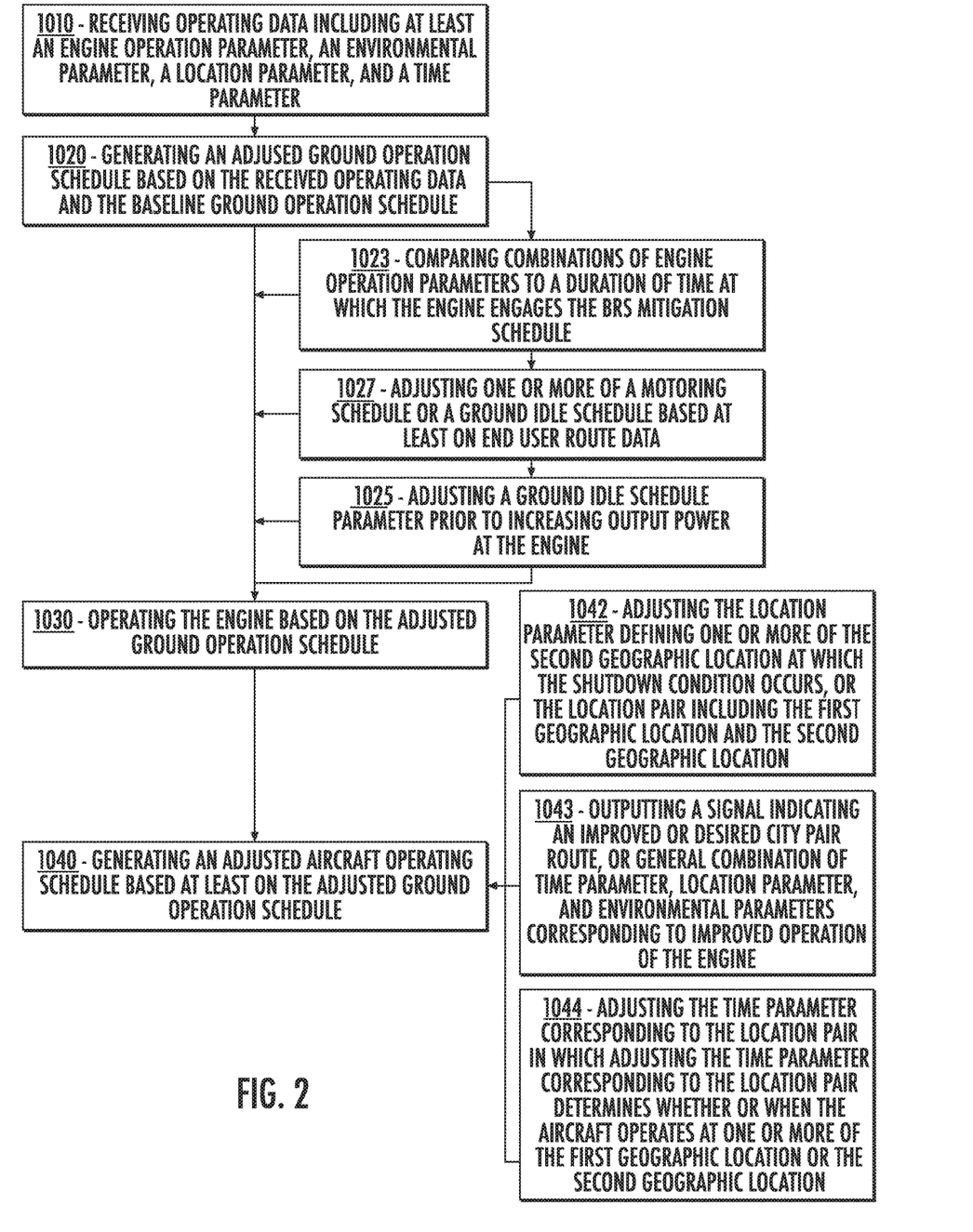
FIG. 2 is a flowchart outlining steps of a method for operating a turbo machine.

Referring now to FIG. 2, a flowchart outlining steps for a method for operating a turbine engine is provided (hereinafter, "method 1000"). The method 1000 may particularly mitigate bowed rotor starts (BRS) in turbine engines, in which a rotor assembly experiences bowing due to a thermal gradient (e.g., radially or circumferentially) following operation and rest of the turbine engine. Embodiments of the method 1000 provided herein identify significant factors that may affect BRS, such as to mitigate the condition or improve alleviation of the condition once established in the engine. The method 1000 may further desirably alter turbine operation such as to vary start time logic for turbine engines, thereby reducing BRS mitigation time based on the identified factors and conditions.

The method 1000 includes at 1010 receiving, measuring, calculating, or otherwise obtaining (hereinafter "receive") operating data including at least an engine operation parameter, an environmental parameter, a location parameter, and a time parameter. Engine operation parameters may include lubricant temperature and pressure, fuel temperature and pressure, rotor assembly or static assembly surface temperature and proximate air temperature during operation and following engine operation (e.g., inlet temperature, compressor temperature, turbine temperature, exhaust gas temperature, etc.), engine cycle count (e.g., quantity of times the rotor assembly increased and decreased above a threshold speed), elapsed time of operation of the immediately previous cycle (e.g., a duration of engine operation between takeoff and shutdown), engine operating mode (e.g., start-up, ignition, ground or flight idle, takeoff, climb, cruise, approach, reverse, shutdown, etc., or one or more steady state or transient conditions therebetween), total engine lifetime operation, vibration data at the engine, fuel pressure or flow during operation, or other engine temperature, pressure, flow, vibration, or load measurements.

Environmental parameters may include one or more ambient air parameters including air temperature, air or atmospheric pressure, air density, altitude, humidity, atmospheric particulate matter, or combinations thereof.

Location parameters may include one or more geographic locations corresponding to the environmental parameters and the engine operation parameters. The location parameter may include a first geographic location corresponding to a start-up or takeoff condition of the engine and a second geographic location corresponding to a landing or shutdown condition of the engine, and route data corresponding to a geographic route taken from the first geographic location to the second geographic location. The location parameter may further include a location pair corresponding to discrete combinations of the first geographic location and the second geographic location, or further corresponding to the first and second geographic locations and the route data relative thereto.

Time parameters may include timestamps (e.g., minute, hour, day, month, year, etc.) corresponding to each engine operational parameter, environmental parameter, and location parameter. The time parameter may further include discrete timestamps or durations (e.g., elapses of time).

The method 1000 at 1010 further receives the engine operation parameters based at least on operation of the engine by an end user, such as, commercial or military gas turbine engine operations. In various embodiments, the end user may refer particularly to an airline or other aircraft operator to which the engine is provided as a propulsion system or power generation unit.

At 1015, the method 1000 includes operating the engine based on a baseline ground operation schedule. The baseline ground operation schedule defines a preset program or routine at which the engine normally operates. The baseline ground operation schedule may include one or more tables, charts, functions, lookup tables, or programs providing initial or baseline rotor speeds, variable vane angles, fuel or lubricant flow rates, pressures, or temperatures, pressure ratios, bleed schedules, etc. at which the engine operates at one or more conditions when the aircraft is on the ground (e.g., motoring, startup, idle, taxi, etc.). The baseline ground operation schedule may further generally define the ground operation schedule to which the method 1000 may reset or default to in contrast to the adjusted ground operation schedule.

In various embodiments, the ground operation schedule refers to a motoring schedule (i.e., rotating the rotor assembly without the use of combustion gases) or a startup and ground idle schedule (i.e., rotating the rotor assembly via combustion). The ground idle schedule may particularly refer to a minimum steady state rotational speed of the rotor assembly while the aircraft is on the ground. The ground idle schedule may further refer to the engine producing a low-level thrust or power output corresponding to idling of the aircraft or a taxiing speed.

At 1020, the method 1000 includes generating an adjusted ground operation schedule based on the received operating data and the baseline ground operation schedule. The method 1000 further includes at 1030 operating the engine based on the adjusted ground operation schedule.

Referring still to the method 1000 at 1020, generating the adjusted ground operation schedule is based on a machine learning algorithm. In various embodiments, the machine learning algorithm is further based on a classification algorithm. The classification algorithm defines a supervised machine learning approach in which engine operation parameters are received and corresponded to a length of time at which the engine performs a bowed rotor start (BRS) mitigation schedule. The BRS mitigation schedule rotates the rotor assembly such as to reduce the thermal gradient across the rotor assembly, thereby reducing rotor bow to reduce undesired vibrations at the rotor assembly below a threshold limit prior to further acceleration of the rotor assembly. The BRS mitigation schedule may particularly occur via engine motoring. Engine motoring may include dry motoring techniques, such as via an air turbine starter, a motor/generator connected electrically and mechanically to the rotor assembly, or an external source of rotation (e.g., a force of air or other fluid provided to the rotor assembly). However, it should be appreciated that other motoring systems may be utilized to rotate the rotor assembly to reduce the thermal gradient. Furthermore, other systems may be utilized to reduce the thermal gradient, such as, but not limited to, cooling fluid sources, external fans, pumps, or other means for reducing the thermal gradient at the rotor assembly.

The BRS mitigation schedule may still particularly be employed prior to a startup condition of the engine. The startup condition may include a rotational speed at which fuel is introduced to a combustion section for ignition. Generally, the BRS mitigation schedule rotates the rotor assembly at a speed lower than the startup condition. In various embodiments, the BRS mitigation schedule rotates the rotor assembly at a speed lower than an ignition or idle speed of the engine (i.e., lower than a speed corresponding to a minimum steady state operation of the engine at which combustion occurs). In various embodiments, the BRS mitigation schedule defines a rotational speed of the rotor assembly, a duration of rotation, an acceleration or deceleration of rotor speed, a frequency or changes in rotor speed (i.e., a frequency of accelerations and decelerations between a first speed and a second speed, including a zero rotational speed and a greater than zero rotational speed), or combinations thereof.

In various embodiments, the method 1000 further includes at 1023 comparing combinations of engine operation parameters to a duration of time at which the engine engages the BRS mitigation schedule before undesired vibrations are reduced at the rotor assembly below a threshold limit prior to further acceleration of the rotor assembly. In one embodiment, the method 1000 further includes at 1025 adjusting a ground idle schedule parameter prior to increasing output power at the engine. The ground idle schedule parameter may include one or more of a rotational speed of the rotor assembly, a minimum duration at which the engine maintains the ground idle schedule prior to increasing output power, or combinations thereof. The minimum duration at which the engine maintains the ground idle schedule may correspond to a minimum duration at which the engine must maintain ground idle condition (e.g., a minimum steady state operating condition) prior to increasing output power, such as to a mid-power or high-power condition (e.g., takeoff).

In still various embodiments, the method 1000 further includes at 1027 adjusting one or more of a motoring schedule or a ground idle schedule based at least on end user route data. In one embodiment, generating the adjusted ground operation schedule at 1020 based at least on end user route data includes adjusting one or more environmental parameters defining one or more ambient air parameters at a geographic location at which the engine is located prior to adjusting the ground operation schedule at 1020.

In further embodiments, generating the adjusted ground operation schedule based at least on end user route data includes engine operation duration (e.g., elapsed time) between takeoff at a first geographic location and shutdown at a second geographic location. Generating the adjusted ground operation schedule based at least on end user route data may refer to location parameters defining a discrete city pair between which an aircraft is flown. The city pairs may further include data specific to the city pair, or more particularly, the airport at each of the first geographic location and the second geographic location of the city pair, such as, but not limited to, environmental parameters on the ground at each geographic location. For example, ground operation of the engine may differ significantly at high-altitude cities (e.g., Mexico City, La Paz, etc.), high temperature cities (e.g., Kuwait City), or conditions referred to as "Hot and High", in which an airport characterizes both relatively high temperatures and relatively high altitudes such as to provide relatively low air density that my significantly affect engine operation, or other conditions referred to as "Hot and Harsh" (e.g., Dubai), in which an airport characterizes high temperatures, high particulate matter (e.g., sand), and other adverse operating conditions.

In still various embodiments, generating the adjusted ground operation schedule based at least on end user route data at 1020 further includes a time parameter defining an engine operation duration between takeoff at the first geographic location and shutdown at the second geographic location. Additionally, or alternatively, the engine operation parameter(s) defining a takeoff condition and a shutdown condition, the time parameter(s) corresponding to the takeoff condition and the shutdown condition, the location parameter(s) corresponding to the first and second geographic locations, and the environmental parameter(s) to each of the first and second geographic locations, or routes therebetween, are further compared to one another. Still further, the engine operation parameter may include one or more of a lubricant temperature or pressure, a rotor surface temperature, an air temperature within the engine, an engine cycle quantity, or a duration of engine operation between the takeoff condition and the shutdown condition, and further compared to one or more of the time parameter, the location parameter, and the environmental parameter. For example, the method 1000 at 1020 may include comparing an engine parameter and a time parameter including a duration at which the engine operated in the environmental conditions at the first geographic location versus the environmental conditions at the second geographic location.

The method 1000 receives at 1010 the engine operation parameters and generates at 1020 the adjusted ground operation schedule via the machine learning algorithm configured to observe the engine operational data at the first geographic location, the second geographic location, and therebetween such as to identify (e.g., at 1025) factors to adjust the ground the operation schedule of the engine at the next ground operation of the engine. Still further, the method 1000 may store the adjusted ground operation schedule such as to use and execute the schedule specific to the geographic location. As such, the method 1000 adjusts the ground operation schedule to the location at which the engine performs the ground operation schedule and the conditions from which it immediately preceded. Exemplary classification algorithms may include, but are not limited to, Random Forest, XG Boost, Logistic Regression, Naive Bayes Classifier, Support Vector Machines, Decision Trees, Boosted Trees, Random Forest, Neural Networks, or Nearest Neighbor.

Embodiments of the method 1000 described herein may desirably reduce responses during BRS mitigation, such as to reduce start times, provide improved clearance control between the rotor and static structure, and reduce high cycle fatigue failures. Improved and optimized BRS mitigation schedules may improve turnaround times at specific geographic locations, operating conditions, or ambient conditions, thereby improving engine and aircraft operating costs and revenue. Improved clearances may further reduce specific fuel consumption, such as to further improve operating costs of the engine. Reduced fatigue may further improve engine life by reducing wear, deterioration, and increase time between repair and overhaul, thereby enabling improved operating cost and revenue.

Figure 3:
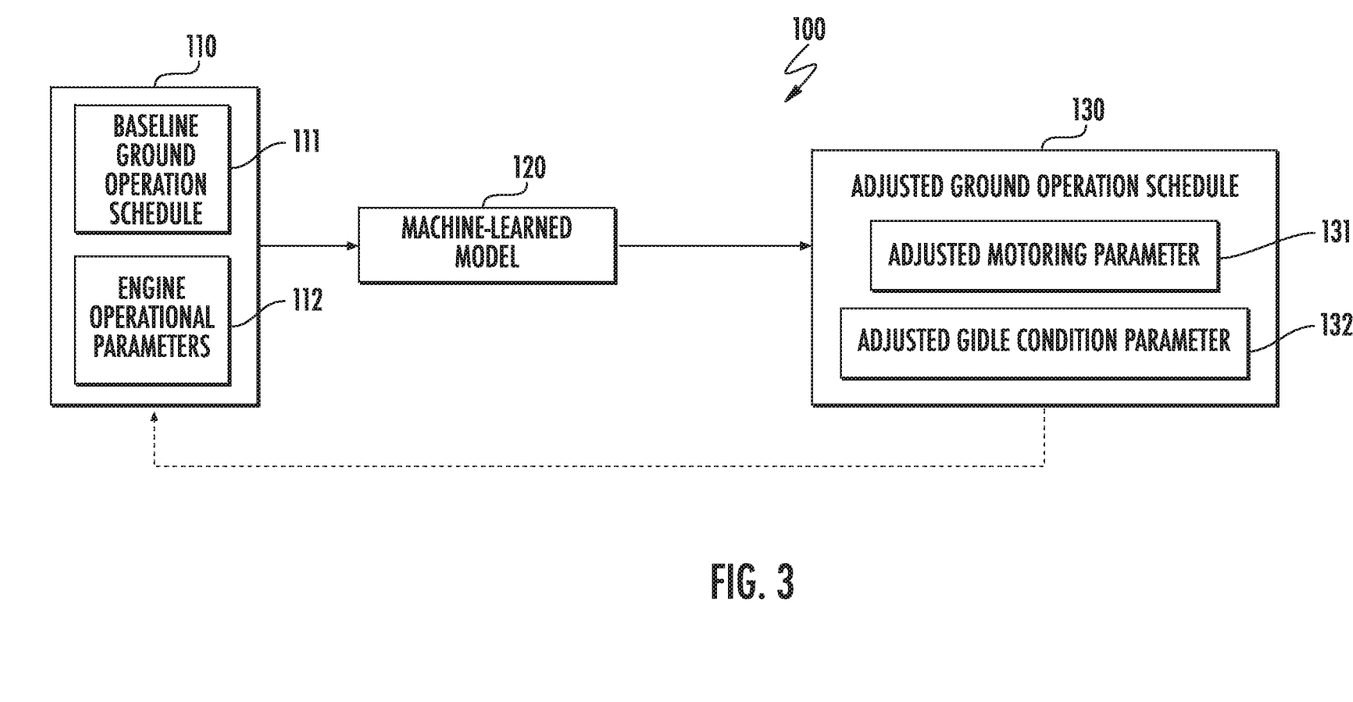
FIG. 3 depicts an exemplary system according to an aspect of the present disclosure.

Referring now to FIG. 3, an exemplary chart is provided depicting a system 100 configured to execute steps of the method 1000. The engine operation parameters measured, obtained, or otherwise received at 1010 from end user operation of the engine is provided to a machine-learned model 120 as input data 110. The machine-learned model 120 defining a classification algorithm classifies the input data 110 as either a binary classification (e.g., affecting the BRS mitigation schedule or not affecting the BRS mitigation schedule) or a numerical classification, such as to provide a probabilistic determination of which combinations of engine operation parameters affect a bowed rotor condition such as to adjust the BRS mitigation schedule accordingly. For example, the machine-learned model 120 receives input data 110 such as the baseline ground operation schedule 111 and the engine operation parameters 112. The engine operation parameters 112 include, but are not limited to, lubricant parameters (e.g., temperature, pressure), fuel parameters (e.g., temperature, pressure) rotor assembly temperature, air temperature internal to the engine, ambient air parameters outside of the engine (e.g., temperature, pressure), first geographic location parameters (e.g., location, altitude, ambient air parameters, etc.), second geographic location parameters (e.g., location, altitude, ambient air parameters, etc.), duration of engine operation at and between the first geographic location and the second geographic location (e.g., from start and takeoff at the first geographic location to shutdown at the second geographic location), and other engine operation parameters, and compares combinations of these parameters to a duration of time at which the engine engages the BRS mitigation schedule before undesired vibrations are reduced at the rotor assembly below a threshold limit prior to further acceleration of the rotor assembly (e.g., method 1000 at 1023).

The compared combinations of engine operation parameters are utilized to generate an adjusted ground operation schedule 130 based on the measured engine operation parameters and a baseline ground operation schedule. The adjusted ground operation schedule 130 further includes an adjusted motoring schedule131 and/or an adjusted ground idle (GIDLE) schedule 132, such as described in regard to the method 1000 at 1015, 1020, 1023, 1025, and 1027. The system 100 and method 1000 further utilizes the adjusted ground operation schedule 130 and the input data 110 into the machine-learned model 120 at a feedback loop to further adjust the adjusted ground operation schedule 130.

The system 100 including the machine-learned model 120 based on the method 1000 outlined in FIG. 2 may improve engine operation and efficiency via decreased BRS mitigation schedule durations when the BRS condition is less likely to occur or increased BRS mitigation schedule durations when the BRS condition is more likely to occur. The method 1000 and system 100 may generally adjust the ground operation schedule, including one or more of the motoring schedule and/or the ground idle schedule, such as to mitigate formation of rotor bow or to more quickly alleviate rotor bow when the condition has occurred.

The system 100 and method 1000 provided herein may include technical effects and benefits over physics-based models for adjusting BRS conditions at a rotor assembly. For example, rotor bow conditions are broadly understood via engine testing and preset manufacturer schedules. However, actual rotor bow formations and conditions contributing to the duration of the rotor bow condition vary based at least on engine usage (e.g., ambient air parameters, thrust output, aircraft loading, etc.), wear, deterioration, and location (e.g., influential of ambient air parameters, runway length, engine usage, etc.).

Furthermore, as vibrations during initial motoring or startup of the rotor assembly may determine whether the rotor assembly defines the rotor bow condition (e.g., in contrast to actual observation of a bowed rotor), vibration measurements may be influenced by factors indirectly related to bowed rotor, or furthermore, unrelated to bowed rotor. For example, the engine operation parameters may include city pairs (i.e., departure and arrival destinations of the aircraft to which the engine is powering), timestamps (e.g., minute, hour, day, month, year, etc.) for engine startup, shutdown, and duration therebetween, and ambient air parameters at each geographic location (i.e., at each city of the city pair). Although the city per se may be unrelated to whether a bowed rotor condition is more or less likely to occur, the engine operation parameters associated with the city (e.g., ambient air parameters versus timestamp, duration of operation to arrive at the city, ambient air conditions when the engine is restarted to depart from the previously-arrived city, etc.) may all correlate to conditions that contribute to the bowed rotor condition.

As a bowed rotor condition cannot generally be determined until the BRS condition has already formed (e.g., via indication of undesired vibrations, or broad assumption via a manufacturer preset schedule), the method 1000 and system 100 provided herein enables use of input data 110 including the engine operation parameters 112 and the baseline ground operation schedule 111 (e.g., the manufacturer preset schedule) to adjust the ground operation schedule via a probabilistic determination. For example, the method 1000 may enable a probabilistic determination of how to adjust the ground operation schedule to mitigate or alleviate BRS based on conditions between a first geographic location (e.g., city A) and a second geographic location (e.g., city B) and apply to another city pair (e.g., city A' and city B') such as to predictively mitigate or alleviate the bowed rotor condition.

In various embodiments, the method 1000 further includes at 1040 generating an adjusted aircraft operating schedule based at least on the adjusted ground operation schedule. The aircraft operating schedule defines one or more of route by which the aircraft travels between city pairs, such as from the first geographic location (e.g., takeoff) to the second geographic location (e.g., landing). In one embodiment, the method 1000 at 1040 further includes at 1042 adjusting the location parameter defining one or more of the second geographic location at which the shutdown condition occurs, or the location pair including the first geographic location and the second geographic location. The method 1000 may further include at 1043 outputting a signal indicating an improved or desired city pair, route, or general combination of time parameter, location parameter, and environmental parameters corresponding to improved operation of the engine (e.g., improved engine operation parameters) such as to mitigate the bowed rotor condition or generally improve life or performance of the engine.

In another embodiment, the method 1000 at 1040 may further include at 1044 adjusting the time parameter corresponding to the location pair in which adjusting the time parameter corresponding to the location pair determines whether or when the aircraft operates at one or more of the first geographic location or the second geographic location. In various embodiments, the method 1000 may include adjusting the aircraft operating schedule such as to recommend or otherwise provide an alternative location pair (e.g., city A' and city B') at which the time parameter, location parameter, and environmental parameter may mitigate a bowed rotor condition or generally improve engine life or performance.

Figure 4:
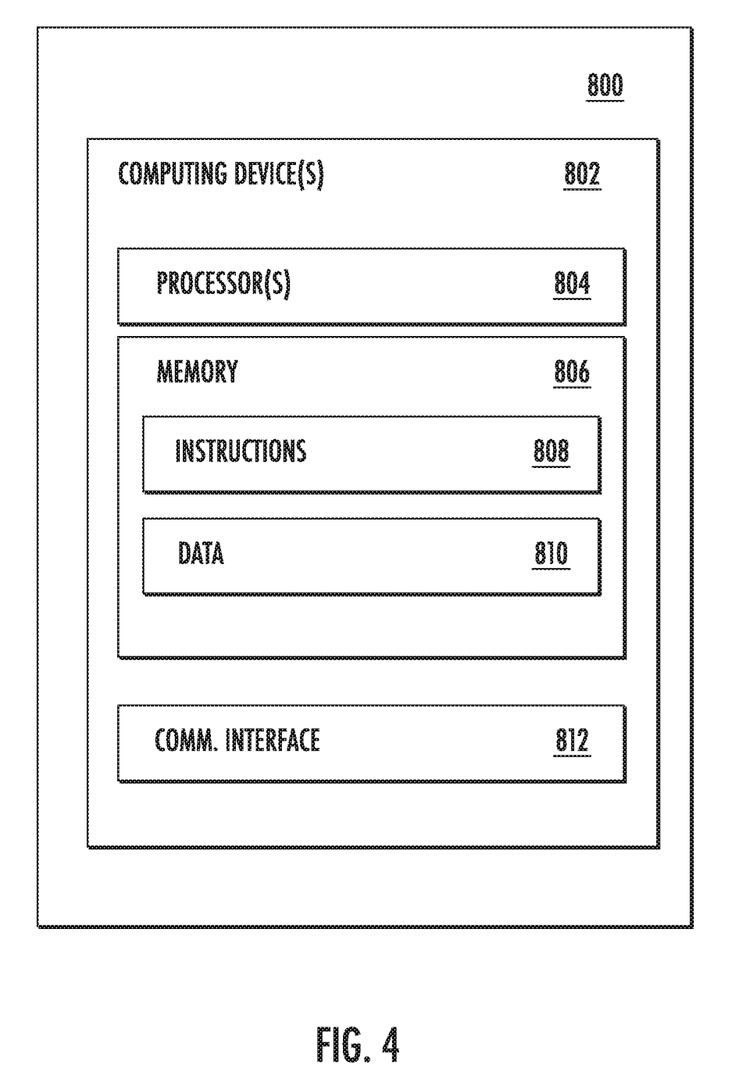
FIG. 4 depicts an exemplary computing system according to embodiments of the present disclosure.

Example aspects of the present disclosure can further provide an improvement in computing technology, such as an improved engine 10 and controller 800. For instance, the use of machine learning instead of physics based computations can provide for the development of models that are easier to evaluate relative to physics-based models for the prediction, mitigation, or alleviation of rotor bow and adjustments to BRS mitigation schedules. This can save processing and storage resources of a computing system. The model(s) can also provide for the faster processing and prediction, mitigation, alleviation, and adjustment of ground operation schedules.

Additionally, or alternatively, example aspects of the present disclosure may provide for an improvement in computing technology, engine systems, engine operation, and/or aircraft operation via the use of continuously evolving machine learning for providing prediction, mitigation, or alleviation of rotor bow, adjustments to engine operating schedules or aircraft operation routes (e.g., city pairs), or numerical determinations as to magnitudes of adjustments to rotor speed acceleration, rotor steady state speed, duration of rotor assembly motoring, or frequency of rotor assembly motoring, such as to mitigate and/or improve alleviation of rotor bow conditions.

According to some aspects of the disclosed technology, the system 100 can generate automated messages associated with the engine 10, such as to provide continuous updates to the adjusted ground operation schedule 130, operational recommendations to the end user (e.g., the pilot, the aircraft operator, airlines, etc.), including forecast reports, engine optimization recommendations to mitigate or alleviate BRS condition, changes in operational routes or schedules (e.g., city pairs, geographic location, time/date of operating at the geographic locations, etc.) such as to maintain or improve engine health via avoiding undesired start conditions (e.g., high vibration starts) due to the operating route or schedule. One or more operations, manoeuvers, or adjustments to engine or aircraft operation can be performed in response to the automated messages. For example, the messages may recommend an adjustment or change in engine speed, vane schedule, fuel parameters, lubricant parameters, etc. such as to decrease the likelihood of BRS condition formation, or to mitigate or alleviate the BRS condition.

FIG. 4 depicts a block diagram of an example computing system 800 that can be used to implement the systems and methods according to example embodiments of the present disclosure. The computing system 800 provided herein is configured to receive and store the input data 110 and the machine-learned model and algorithm 120, and determine, adjust, and store one or more adjusted ground operation schedules 130, including the adjusted motoring parameter(s) 131 and adjusted ground idle condition parameter(s) 132, such as depicted and described regarding the system 100 provided in FIG. 3. As shown, the system can include one or more computing device(s) 802. The one or more computing device(s) 802 can include one or more processor(s) 804 and one or more memory device(s) 806. The one or more processor(s) 804 can include any suitable processing device, such as a microprocessor, microcontroller, integrated circuit, logic device, or other suitable processing device. The one or more memory device(s) 806 can include one or more computer-readable media, including, but not limited to, non-transitory computer-readable media, RAM, ROM, hard drives, flash drives, or other memory devices.

The one or more memory device(s) 806 can store information accessible by the one or more processor(s) 804, including computer-readable instructions 808 that can be executed by the one or more processor(s) 804. The instructions 808 can be any set of instructions that when executed by the one or more processor(s) 804, cause the one or more processor(s) 804 to perform operations. The instructions 808 can be software written in any suitable programming language or can be implemented in hardware. In some embodiments, the instructions 806 can be executed by the one or more processor(s) 804 to cause the one or more processor(s) 804 to perform operations. The memory device(s) 806 can further store data 810 that can be accessed by the processors 804. For example, the data 810 can include engine operation parameters 112, the baseline ground operation schedule 111, the machine-learned model or algorithm 120, one or more adjusted ground operation schedules 130, one or more adjusted motoring parameters 131, or one or more adjusted ground idle condition parameters 132. The instructions 808 may generally include any set of instructions configured to execute one or more steps of the method 1000 described herein.

The one or more computing device(s) 802 can also include a communication interface 812 used to communicate, for example, with the other components of the system and/or other computing devices. The communication interface 812 can include any suitable components for interfacing with one or more network(s), including for example, transmitters, receivers, ports, controllers, antennas, or other suitable components.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating a turbine engine for an aircraft, the method comprising:

receiving operating data comprising at least an engine operation parameter, an environmental parameter, a location parameter, and a time parameter;

operating the turbine engine based on a baseline ground operation schedule;

generating an adjusted ground operation schedule based on the operating data and the baseline ground operation schedule, wherein generating the adjusted ground operation schedule is based on a machine learning algorithm; and operating the engine based on the adjusted ground operation schedule.

2. The method of claim 1, wherein generating the adjusted ground operation schedule based on the machine learning algorithm comprises generating the adjusted ground operation schedule based on a classification algorithm.

3. The method of claim 1, wherein the ground operation schedule comprises a bowed rotor mitigation schedule, wherein the bowed rotor mitigation schedule comprises a rotor speed, a rotor acceleration, a duration of rotation of the rotor assembly, and a frequency of changes to the rotor speed from a first speed to a second speed.

4. The method of claim 3, wherein the bowed rotor mitigation schedule comprises one or more of a motoring schedule or a ground idle schedule.

5. The method of claim 4, wherein adjusting the ground operation schedule comprises adjusting the motoring schedule prior to ignition of the engine.

6. The method of claim 4, wherein adjusting the ground operation schedule comprises adjusting the ground idle schedule prior to increasing output power at the engine.

7. The method of claim 1, wherein the operational data comprises the environmental parameter defining one or more ambient air parameters at a geographic location at which the engine is located prior to adjusting the ground operation schedule.

8. The method of claim 7, wherein the operational data comprises the time parameter defining an engine operation duration between takeoff at a first geographic location and shutdown at a second geographic location.

9. The method of claim 7, further comprising comparing the engine operation parameter defining at least a takeoff condition and shutdown condition, the time parameter corresponding to each of the takeoff condition and the shutdown condition, the location parameter corresponding to a first geographic location and a second geographic location, and the environmental parameter corresponding to an ambient air parameter corresponding to each of the first geographic location and the second geographic location.

10. The method of claim 9, wherein the engine operation parameter further comprises one or more of a lubricant temperature, a lubricant pressure, a rotor surface temperature, an air temperature within the engine, an engine cycle quantity, or a duration of engine operation between the takeoff condition and the shutdown condition.

11. The method of claim 1, further comprising:

generating an adjusted aircraft operating schedule based at least on the adjusted ground operation schedule.

12. The method of claim 11, wherein generating the adjusted aircraft operating schedule comprises adjusting the location parameter defining one or more of a second geographic location at which the shutdown condition occurs, or a location pair comprising a first geographic location at which a takeoff condition occurs and the second geographic location.

13. The method of claim 12, wherein generating the adjusted aircraft operating schedule comprises adjusting the time parameter corresponding to the location pair, wherein adjusting the time parameter corresponding to the location pair determines whether or when the aircraft operates at one or more of the first geographic location or the second geographic location.

14. A gas turbine engine, the engine comprising:
a sensor configured to obtain one or more engine operation parameters based at least on a rotor assembly or a lubricant system; and
a controller, wherein the controller is configured to store a baseline ground operation schedule and a machine learning algorithm, and further wherein the controller is configured to execute operations, the operations comprising:
receiving, via the sensor, operating data comprising at least an engine operation parameter, an environmental parameter, a location parameter, and a time parameter;
operating the gas turbine engine based on a baseline ground operation schedule;
generating, via the machine learning algorithm, an adjusted ground operation schedule based on the operating data and the baseline ground operation schedule; and
operating the gas turbine engine based on the adjusted ground operation schedule.

15. The gas turbine engine of claim 14, wherein the ground operation schedule comprises a rotor speed, a rotor acceleration, a duration of rotation of the rotor assembly, and a frequency of changes to the rotor speed from a first speed to a second speed.

16. The gas turbine engine of claim 14, wherein generating the adjusted ground operation schedule comprises adjusting one or more of a motoring parameter or a ground idle condition parameter based at least on end user route data.

17. The gas turbine engine of claim 14, the operations further comprising comparing the engine operation parameter defining at least a takeoff condition and shutdown condition, the time parameter corresponding to each of the takeoff condition and the shutdown condition, the location parameter corresponding to a first geographic location and a second geographic location, and the environmental parameter corresponding to an ambient air parameter corresponding to each of the first geographic location and the second geographic location.

18. The gas turbine engine of claim 17, the operations further comprising:
generating an adjusted aircraft operating schedule based at least on the adjusted ground operation schedule, wherein generating the adjusted aircraft operating schedule comprises adjusting the location parameter defining one or more of a second geographic location at which the shutdown condition occurs, or a location pair comprising a first geographic location at which a takeoff condition occurs and the second geographic location.

19. A computer-implemented method for mitigating rotor bow at a gas turbine engine, the method comprising:
receiving operating data comprising at least an engine operation parameter, an environmental parameter, a location parameter, and a time parameter;
operating the gas turbine engine based on a baseline ground operation schedule;
generating, via a machine learning algorithm, an adjusted ground operation schedule based on the operating data and the baseline ground operation schedule; and
operating the gas turbine engine based on the adjusted ground operation schedule.

20. The computer-implemented method of claim 19, wherein the ground operation schedule comprises adjusting one or more of a motoring schedule or a ground idle schedule based at least on the environmental parameter at a geographic location at which the engine is located prior to adjusting the ground operation schedule, and further based at least on the time parameter corresponding at least to engine operation duration between takeoff at a first geographic location and shutdown at a second geographic location.

* * * * *